United States Patent [19]

Mori

[11] Patent Number: 5,769,936
[45] Date of Patent: Jun. 23, 1998

[54] METHOD FOR PRODUCING FLY ASH GRANULES

[75] Inventor: Kenji Mori, Yokohama, Japan

[73] Assignee: Mitsubishi Chemical Corporation, Tokyo, Japan

[21] Appl. No.: 581,272

[22] Filed: Dec. 29, 1995

[51] Int. Cl.$^6$ .......................... C04B 14/00; C04B 14/04; C04B 18/04

[52] U.S. Cl. .......................... 106/405; 106/708; 106/709; 106/710; 106/DIG. 1; 264/DIG. 49

[58] Field of Search ...................................... 106/405, 705, 106/DIG. 1, 708, 709, 407, 710; 119/171; 264/DIG. 49

[56] References Cited

U.S. PATENT DOCUMENTS

| 4,129,094 | 12/1978 | Stockel | 119/171 |
|---|---|---|---|
| 4,352,856 | 10/1982 | Smillie | 106/DIG. 1 |

FOREIGN PATENT DOCUMENTS

| 0 431 503 | 6/1991 | European Pat. Off. . | |
|---|---|---|---|
| 671 785 | 3/1966 | France . | |
| 253 420 | 1/1988 | Germany . | |
| 54-162674 | 12/1979 | Japan . | |
| 58-20283 | 2/1983 | Japan . | |
| 60-191121 | 9/1985 | Japan . | |
| 5-59363 | 3/1993 | Japan . | |

OTHER PUBLICATIONS

Database WPI, Derwent Publications, AN–68–09832Q, JP–B–43 016 554 (Date unknown).
Database WPI, Derwent Publications, AN–94–107061, JP–A–06 057 250, Mar. 1, 1994.
Patent Abstracts of Japan, vol. 18, No. 015 (C–1151), Jan. 12, 1994, JP–A–05 254906, Oct. 5, 1993.

*Primary Examiner*—Michael Marcheschi
*Attorney, Agent, or Firm*—Oblon, Spivak, McClelland, Maier & Neustadt, P.C.

[57] ABSTRACT

A method for producing fly ash granules, which comprises mixing 100 parts by weight of fly ash, from 0.001 to 1 part by weight of a water-soluble polymer having from 2 to 80 mol %, based on the total repeating units, of repeating units having carboxyl groups, and from 40 to 100 parts by weight of water, for granulation.

17 Claims, No Drawings

METHOD FOR PRODUCING FLY ASH GRANULES

The present invention relates to reuse of fly ash generated at e.g. thermal electric power plants, as a useful resource.

The amount of fly ash generated at coal thermal electric power plants in Japan is estimated to be 5,000,000 tons in 1990, and its utilization has been studied for many years. However, only a very small fraction has been utilized for e.g. fly ash cement, and the majority has been treated for reclamation of the seashore. The treated amount is so huge that pollution of the marine environment is feared, and each power plants has difficulties in the disposal of fly ash.

Under these circumstances, Japanese Unexamined Patent Publication No. 232957/1984 proposes a method which comprises treating fly ash with steam to solidify it, followed by pulverization to obtain granules. This method is simple, but the strength of the obtained granules is poor. Further, the granules are irregular in shape and have sharp edges. Accordingly, when they are used to bury underground pipelines for e.g. power cables, there will be a problem that the pipelines are likely to receive scratch marks.

Further, a method has been reported in which cement and water are added to fly ash, and machine granulation is applied thereto to obtain fly ash granules, which are useful as fine aggregates (Tadashi Yamamoto, Gypsum & Lime, 222, 62–68 (1989), Tadashi Yamamoto et al, Raw Materials for Construction, 1 (1), 2–9 (1991)). However, this method requires a granulator and has had a problem also in the productivity.

The present inventors have conducted extensive studies on granulation method with an aim to further promote unitization of fly ash and as a result, have found it possible to readily granulate fly ash by a simple mixer or stirrer by combining fly ash, a certain specific water-soluble polymer and water. The present invention has been accomplished on the basic of this discovery. That is, the present invention provides a method for producing fly ash granules, which comprises mixing 100 parts by weight of fly ash, from 0.001 to 1 part by weight of a water-soluble polymer having from 2 to 80 mol %, based on the total repeating units, of repeating units having carboxyl groups, and from 40 to 100 parts by weight of water, for granulation.

Now, the present invention will be described in detail with reference to the preferred embodiments. The fly ash granules of the present invention are spherical particles having a particle strength of usually at least 1.5 kg/particle, preferably from 2 to 10 kg/particle, a specific gravity of usually from 1.0 to 2.0 g/cm$^3$, a water absorptivity of usually at least 20%, a bulk density of usually from 0.5 to 1 g/cm$^3$ and an average particle size of usually from 0.1 to 30 mm, which are granulated by mixing water and a very small amount of a water-soluble polymer to fly ash.

The fly ash to be used in the present invention is fly ash collected from a flue gas of a pulverized coal firing boiler. It is usually fly ash generated at coal thermal electric power plants, irrespective of the type or the production site of the raw material coal. The composition of the fly ash varies more or less depending upon the raw material coal. However, it usually contains, as constituting components, from 50 to 70 wt % of $SiO_2$, from 10 to 40 wt % of $Al_2O_3$ and other components such as $Fe_2O_3$, CaO and MgO.

In the present invention, a specific water-soluble polymer is used, whereby it is possible to produce fly ash granules simply by mixing by a mixer or a stirrer. Further, by the addition of the specific water-soluble polymer, it is possible to prevent the water-containing fly ash from adhering to the mixer or stirrer.

The specific water-soluble polymer to be used in the present invention is an anionic water-soluble polymer which is soluble in an amount of at least 1 g in 100 ml of water and has from 2 to 80 mol %, preferably from 5 to 60 mol %, based on the total repeating units, of repeating units having carboxyl groups. Such carboxyl groups may be present in the form of either a free acid or a salt. As such a water-soluble polymer, a synthetic polymer, a semisynthetic polymer or a natural polymer may be employed, and the molecular weight is usually at least 1,000,000, preferably at least 5,000,000.

The synthetic water-soluble polymer may, for example, be an acrylamide type polymer containing repeating units derived from acrylic acid or its salt, a methacrylamide type polymer containing repeating units derived from methacrylic acid or its salt, a copolymer of vinyl acetate with maleic acid or its salt, or a copolymer of acrylamide or methacrylamide with itaconic acid or its salt. The acrylamide type polymer containing units derived from acrylic acid or its salt may, for example, be a partial hydrolyzate of a polyacrylamide as well as the one obtained by copolymerizing acrylamide with acrylic acid or its salt. The methacrylamide type polymer containing repeating units derived from methacrylic acid or its salt may, for example, be a partial hydrolyzate of a polymethacrylamide as well as the one obtained by copolymerizing methacrylamide with methacrylic acid or its salt. As the natural or semisynthetic water-soluble polymer, guar gum, locustbean gum or a modified product of such a neutral polysaccharide may, for example, be mentioned.

Types of the salt include, for example, a salt of an alkali metal such as sodium or potassium, a salt of an alkaline earth metal such as calcium or magnesium, an ammonium salt, a salt of an amine such as a $C_{1-18}$ alkylamine or an alkanolamine, and a mixture of two or more of them. Preferred is a salt of an alkali metal.

The amount of the water-soluble polymer in the present invention varies depending upon the composition of the fly ash and is not particularly limited. However, it is usually from 0.001 to 1 part by weight, preferably from 0.01 to 0.5 part by weight, per 100 parts by weight of the fly ash. The water-soluble polymer may be used in the form of an aqueous solution. However, it is preferred to use it in the form of a powder, particularly in the form of a powder having an average particle size of at most 0.4 mm, since such a powder can readily be mixed uniformly with the fly ash.

In order for the formed granules to maintain the granular shape for a long period of time and to keep the strength at a high level, it is preferred to add an inorganic solidifying agent. As the inorganic solidifying agent, quick lime and a hydraulic cement may usually be mentioned. Preferred is a hydraulic cement. Specifically, the hydraulic cement may, for example, be a Portland cement such as normal Portland cement, high-early-strength Portland cement or moderate heat Portland cement; a mixture of Portland cement such as blast furnace cement, silica cement or fly ash cement; or a special cement such as alumina cement, ultra high-early-strength cement or jet cement. Further, a hydraulic cement and quick lime may be used in combination. The amount of the inorganic solidifying agent is usually from 0.2 to 40 parts by weight, preferably from 1 to 30 parts by weight, per 100 parts by weight of the fly ash.

The fly ash granules of the present invention can be obtained by a method of granulating by mixing a mixture of fly ash and the water-soluble polymer while adding water to the mixture, or a method of granulating by adding and mixing the water-soluble polymer to fly ash moistened with water. The method of adding the inorganic solidifying agent is not particularly limited. The inorganic solidifying agent may be mixed preliminarily to the fly ash and the water-soluble polymer, or it may be added to the fly ash moistened by addition of water.

Water is added in an amount sufficient to provide a humidity whereby granulation takes place upon stirring it with the fly ash and the water-soluble polymer, and the amount of water varies depending upon the composition or the ignition loss of the fly ash or depending upon whether the inorganic solidifying agent is added or not, but is usually from 40 to 100 parts by weight, preferably from 50 to 80 parts by weight per 100 parts by weight of the fly ash.

The starting material mixture comprising the fly ash, the water-soluble polymer, water and, if necessary, an inorganic solidifying agent, is mixed for granulation usually for at least 20 seconds, preferably from 40 seconds to 5 minutes, to obtain granules. It is preferred that the obtained granules are sieved, if necessary, and cured before use. In the case of curing in air, curing is carried out usually for at least 7 days, preferably at least 14 days. To shorten the curing time, a hydraulic cement such as high-early-strength Portland cement may be used as an inorganic solidifying agent, and curing in air may be conducted for one day, then steam curing is conducted at from 70° to 80° C for 24 hours, and curing in air may further be conducted for 24 hours.

The particle size of the obtained fly ash granules can be adjusted by the water content and the stirring conditions. For example, if the water content is large, the particle size tends to be large, if the water content is small, the granules tend to be fine. For mixing and granulation, a conventional fluidized granulator or a rolling granulator may be employed. It is preferred to employ a mixer or stirrer whereby the materials can be mixed while being rotated. For example, a mixer such as a mortar mixer, a hobert type mixer or a twin-screw kneading mixer may be employed. When a continuous plant of a large scale is contemplated, a twin-screw paddle mixer will be suitable for use.

Now, the present invention will be described in further detail with reference to Examples. However, it should be understood that the present invention is by no means restricted to such specific Examples.

EXAMPLE 1

By means of a hobert type mixer having a capacity of 20 l, 3.38 kg of the fly ash as identified in Table 1, 375 g of normal Portland cement as an inorganic solidifying agent, and 6 g of a powder of a 20 mol % partial hydrolyzate of a polyacrylamide (average particle size: 0.15 mm, molecular weight: 12,000,000) as an anionic water-soluble polymer, were mixed, and the mixture was further stirred while adding 2.25 kg of water, whereby the mixture was gradually granulated. After stirring for 60 seconds, the mixture was taken out and cured in air (20° C., a relative humidity of 80%) for 14 days. After it was further cured in dry air for 24 hours, whereupon the average particle size of the fly ash granules, and the physical properties such as strength, specific gravity and water absorptivity, were measured. The fly ash granules thus obtained were spherical. The physical properties are shown in Table 2.

Average Particle size

In accordance with JIS A1204 "method for testing the particle size of earth", the particle size distribution was measured by means of JIS Z8801 "standard sieves" and the average particle size was calculated.

Strength

10 Granules which passed through a standard sieve with openings of 2.00 mm and which remained on a sieve with openings of 1.70 mm, were taken, and the strength was measured by a compression tester, whereby the average value of the ten granules was obtained. The test was repeated ten times, and the average value was taken as the strength of the granules.

Specific gravity and water absorptivity tests

The tests were conducted in accordance with JIS A1134 "methods for testing the specific gravity and the water absorptivity of light weight aggregates for structures", EXAMPLES 2 and 3

Fly ash granules were prepared in the same manner as in Example 1 except that fly ash A was changed to fly ash B (Example 2) or fly ash C (Example 3) as identified in Table 1, and the physical properties were measured in the same manner as in Example 1. The results are shown in Table 2.

EXAMPLE 4

3.38 g of fly ash A, 375 g of cement and 2.25 kg of water were mixed, then 6 g of the water-soluble polymer as used in Example 1 was added, and the mixture was further stirred, whereby it was gradually granulated. After stirring for 60 seconds, the mixture was cured in the same manner as in Example 1. The physical properties were measured in the same manner as in Example 1. The results are shown in Table 2.

EXAMPLE 5

A mixture comprising 375 g of cement and 6 g of the water-soluble polymer as used in Example 1, was added to a mixture comprising 3.38 kg of fly ash A and 2.25 kg of water, and the mixture was stirred for 60 seconds in the same manner as in Example 1. Then, the mixture was cured in the same manner as in Example 1. The physical properties were measured in the same manner as in Example 1. The results are shown in Table 2.

EXAMPLE 6

Fly ash granules were prepared in the same manner as in Example 1 except that fly ash C was used in an amount of 3.75 kg, and no cement was used, and the physical properties were measured in the same manner as in Example 1. The results are shown in Table 2.

EXAMPLE 7

The improvement test was carried out in the same manner as in Example 1 except that 6 g of a copolymer of acrylamide/sodium acrylate=40/60 (molar ratio) (average particle size: 0.32 mm, molecular weight: 10,000,000) as the water soluble-polymer. The results are shown in Table 2.

Comparative Example 1

The test was carried out in the same manner as in Example 1 except that no water-soluble polymer was used, whereby no granules were formed, and the entire mixture was solidified. The solidified block was taken out and cured in the same manner as in Example 1. Then, it was pulverized, and the physical properties were measured in the same manner as in Example 1. The results are shown in Table 3.

Comparative Example 2

3.75 kg of fly ash C and 2.25 kg of water were mixed in the same manner as in Example 1 without using cement nor a water-soluble polymer, whereby no granules were formed and the entire mixture was solidified. The solidified block was taken out and cured in the same manner as in Example 1. Then, it was pulverized, and the physical properties were measured in the same manner as in Example 1. The results are shown in Table 3.

Comparative Example 3

The improvement test was carried out in the same manner as in Example 1 except that a polyacrylamide (average particle size: 0.20 mm, molecular weight: 12,500,000) as a water-soluble polymer, whereby no granules were formed, and the entire mixture was solidified. The solidified block was cured in the same manner as in Comparative Example 1 and then pulverized. With respect to the pulverized product, the strength test was carried out in the same manner as in Example 1. The results are shown in Table 3.

Comparative Example 4

The improvement test was carried out in the same manner as in Example 1 except that 6 g of a polysodium acrylate (average particle size: 0.18 mm, molecular weight: 60,000) was used as a water-soluble polymer. The results are shown in Table 3.

Comparative Example 5

Fly ash granules were prepared in the same manner as in Example 1 except that 6 g of sodium alginate H (manufactured by Kimitsu Kagaku K.K.) as a water-soluble polymer, and the physical properties were measured in the same manner as in Example 1. The results are shown in Table 3.

TABLE 1

| Fly ash | Composition (wt %) | | | | | | | | |
|---|---|---|---|---|---|---|---|---|---|
| | Ignition loss | $SiO_2$ | $Al_2O_3$ | $Fe_2O_3$ | CaO | MgO | $Na_2O$ | $K_2O$ | $SO_3$ |
| A | 12.6 | 48.2 | 33.8 | 3.2 | 2.4 | 0.9 | 1.0 | 1.0 | 0.4 |
| B | 22.4 | 32.2 | 24.4 | 3.1 | 9.0 | 0.6 | 0.3 | 0.6 | 3.2 |
| C | 30.3 | 25.0 | 18.8 | 4.1 | 13.2 | 0.7 | 0.8 | 0.9 | 8.5 |

TABLE 2

| | Fly ash | Particle strength (kg/particle) | Specific gravity (*) | Water absorptivity (%) | Average particle size (mm) | Bulk density (*) | State |
|---|---|---|---|---|---|---|---|
| Example 1 | A | 3.89 | 1.28 | 35.2 | 1.8 | 0.893 | Granular |
| Example 2 | B | 3.68 | 1.22 | 42.1 | 1.7 | 0.865 | Granular |
| Example 3 | C | 4.02 | 1.31 | 38.1 | 1.8 | 0.881 | Granular |
| Example 4 | A | 3.93 | 1.30 | 37.2 | 1.8 | 0.890 | Granular |
| Example 5 | A | 3.95 | 1.31 | 38.8 | 1.9 | 0.901 | Granular |
| Example 6 | C | 2.01 | 1.25 | 40.1 | 1.7 | 0.875 | Granular |
| Example 7 | A | 4.10 | 1.31 | 40.1 | 1.8 | 0.882 | Granular |

In the Table, * represents $g/cm^3$.

TABLE 3

| | Fly ash | Particle strength (kg/particle) | Specific gravity (*) | Water absorptivity (%) | Average particle size (mm) | Bulk density (*) | State |
|---|---|---|---|---|---|---|---|
| Comparative Example 1 | A | 1.16 | 1.26 | 36.1 | — | 0.918 | Block |
| Comparative Example 2 | C | 0.83 | 1.21 | 37.5 | — | 0.935 | Block |
| Comparative Example 3 | A | 1.08 | 1.22 | 35.3 | — | 0.925 | Block |
| Comparative Example 4 | A | 1.31 | 1.21 | 35.8 | — | 0.930 | Block |
| Comparative Example 5 | A | 1.20 | 1.20 | 35.1 | — | 0.931 | Block |

In the Table, * represents $g/cm^3$.

According to the present invention, it is possible to easily prepare spherical granules of fly ash simply by using a mixer or stirrer by using, as a starting material, fly ash which used to be a waste to be disposed. Further, the fly ash granules of the present invention have high strength and always show a flowability like dry sand. Accordingly, it may be used as a substitute for sand, for example, not only as a substitute for sand for burying pipeline under a road but also as a substitute for all kinds of sand. Further, the fly ash granules obtained by the present invention are smaller in the specific gravity than usual sand and they are spherical. Accordingly, they are most suitable for building materials, particularly for spraying mortar. Further, the granules have a large porosity and water absorptivity, and thus they are expected to provide excellent effects to a building material such as light weight concrete or mortar when used as fine aggregates. Further, it is expected to be useful also as a material for a roadbed or as a material to be mixed to asphalt.

I claim:

1. A method for producing fly ash granules, which comprises mixing 100 parts by weight of fly ash, from 0.001 to 1 part by weight of a water-soluble polymer having repeating units, and having from 2 to 80 mol %, based on the total repeating units, of repeating units having carboxyl groups, and from 40 to 100 parts by weight of water, for granulation, and wherein the parts by weight of polymer and of water are per 100 parts by weight of fly ash.

2. The method according to claim 1, wherein the water-soluble polymer has from 5 to 60 mol %, based on the total repeating units, of repeating units having carboxyl groups.

3. The method according to claim 1, wherein the water-soluble polymer is mixed in an amount of from 0.01 to 0.5 part by weight per 100 parts by weight of the fly ash.

4. The method according to claim 1, wherein water is added in an amount of from 50 to 80 parts by weight per 100 parts by weight of the fly ash.

5. The method according to claim 1, wherein the fly ash and the water-soluble polymer are mixed first, and then water is added and mixed thereto.

6. The method according to claim 5, wherein the water-soluble polymer in a powder form is mixed with the fly ash.

7. The method according to claim 6, wherein the water-soluble polymer powder has an average particle size of at most 0.4 mm.

8. The method according to claim 1, wherein the water-soluble polymer is an acrylamide polymer containing repeating units derived from acrylic acid or its salt, or a methacrylamide polymer containing repeating units derived from methacrylic acid or its salt.

9. The method according to claim 1, wherein the water-soluble polymer is a copolymer of acrylamide with acrylic acid or its salt, or a copolymer of methacrylamide with methacrylic acid or its salt.

10. The method according to claim 1, wherein the water-soluble polymer is a partial hydrolyzate of a polyacrylamide, or a partial hydrolyzate of a polymethacrylamide.

11. The method according to claim 1, wherein the water-soluble polymer is a polysaccharide.

12. The method according to claim 1, wherein an inorganic solidifying agent is added in an amount of from 0.2 to 40 parts by weight per 100 parts by weight of the fly ash.

13. The method according to claim 12, wherein the inorganic solidifying agent is added in an amount of from 1 to 30 parts by weight per 100 parts by weight of the fly ash.

14. The method according to claim 12, wherein the fly ash, the water-soluble polymer and the inorganic solidifying agent are mixed first, and then water is added and mixed thereto.

15. The method according to claim 12, wherein the inorganic solidifying agent is a hydraulic cement.

16. The method according to claim 12, wherein the inorganic solidifying agent is quick lime.

17. The method according to claim 1, wherein the water-soluble polymer is a natural or semisynthetic water-soluble polymer.

* * * * *

UNITED STATES PATENT AND TRADEMARK OFFICE
CERTIFICATE OF CORRECTION

PATENT NO. : 5,769,936
DATED : June 23, 1998
INVENTOR(S) : Kenji MORI

It is certified that error appears in the above-identified patent and that said Letters Patent is hereby corrected as shown below:

On the Title page, Item [30], Foreign Application Priority Data is omitted. It should be:

--Jan. 9, 1995    [JP]    Japan...........7-1364--

Signed and Sealed this

Second Day of February, 1999

Attest:

Attesting Officer

Acting Commissioner of Patents and Trademarks